UNITED STATES PATENT OFFICE.

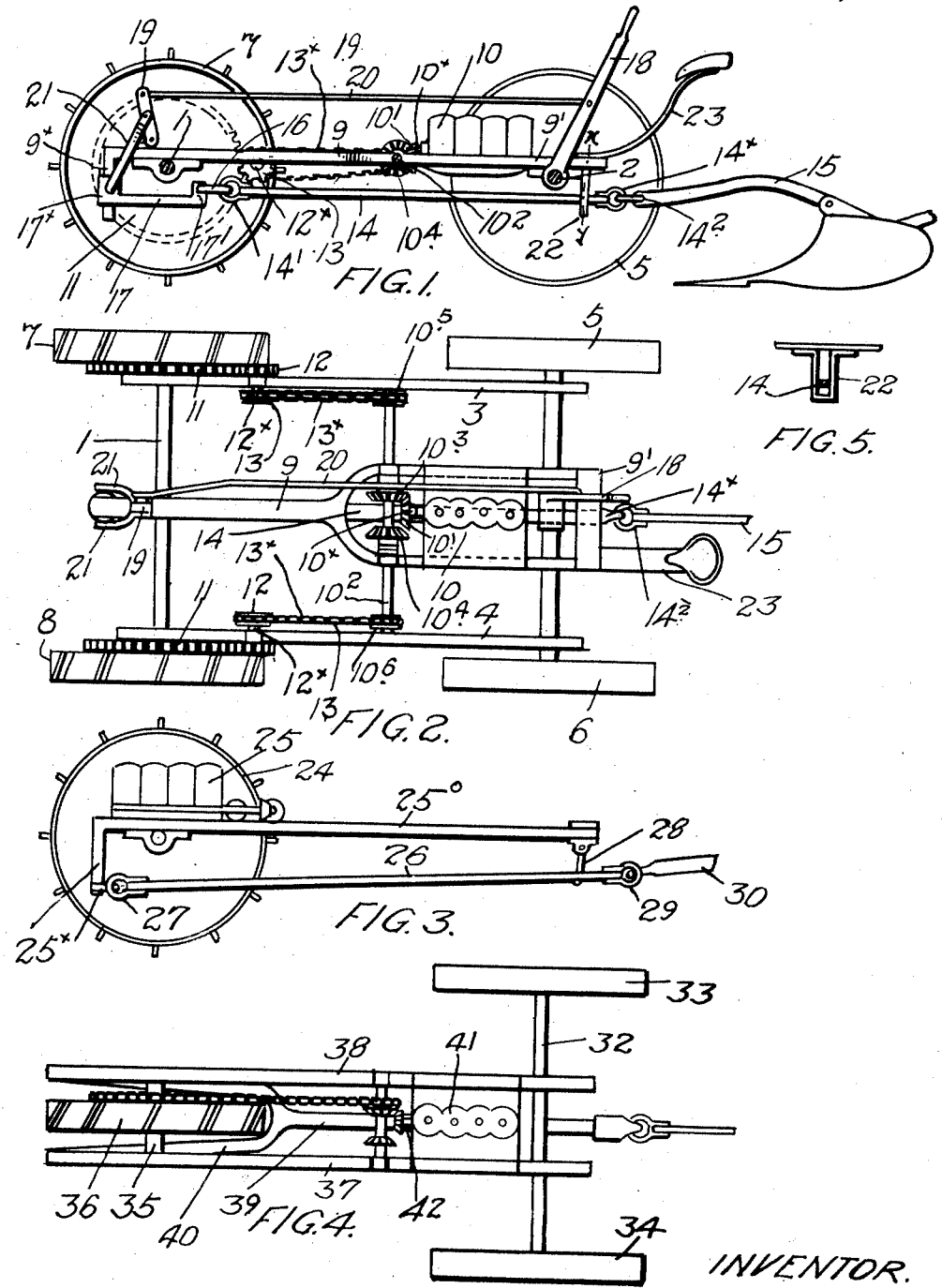

HERBERT JOHNSTON BURKE, OF ESSEX, ONTARIO, CANADA.

TRACTOR-VEHICLE.

1,349,812.

Specification of Letters Patent.

Patented Aug. 17, 1920.

Application filed March 27, 1919. Serial No. 285,594.

*To all whom it may concern:*

Be it known that I, HERBERT JOHNSTON BURKE, of the town of Essex, in the county of Essex, Province of Ontario, Canada, have invented certain new and useful Improvements in Tractor-Vehicles, of which the following is the specification.

My invention relates to improvements in tractor vehicles and the object of the invention is to increase the hauling capacity of the tractor without increasing its size or weight by utilizing the pull of the load upon the draw bar of the tractor for producing such increase in tractive quality of the vehicle and it consists essentially of the following arrangement and construction of parts as hereinafter more particularly explained.

Figure 1, is a longitudinal section through my tractor.

Fig. 2, is a plan view of the tractor as shown in Fig. 1.

Fig. 3, is a longitudinal sectional view through a modified form of tractor where only two carrying wheels are employed.

Fig. 4, is a plan view of a further modified form in which three carrying wheels are employed in the vehicle.

Fig. 5, is a sectional detail on line $x-y$ Fig. 1.

In the drawings like characters of reference indicate corresponding parts in the various figures.

I will first refer to Figs. 1 and 2.

1 indicates the front axle and 2 the rear axle connected together by side bars 3 and 4. 5 and 6 indicate carrying wheels mounted upon the axle 2, and 7 and 8 indicate drive wheels mounted upon the axle 1. 9 indicates a lever which is mounted upon the axle 1 so as to swing freely thereon. The front end of the lever 9 forming the short arm extending beyond the axle 1 is provided with a depending portion $9^x$. The opposite or free end of the lever forming the long arm $9'$ extends rearwardly over the axle 2. The arm $9'$ may be bifurcated as shown in Fig. 2 so as to form a support for the engine 10 by which the vehicle is driven. $10^x$ indicates the engine shaft provided with a bevel gear $10'$. $10^2$ indicates a cross shaft also carried by the lever 9 and provided with bevel gears $10^3$ and $10^4$ suitably splined to the cross shaft $10^2$ and controlled by suitable levers so that they may be alternately carried into and out of engagement with the bevel gear $10'$. $10^5$ and $10^6$ indicate sprocket gears mounted upon the shaft $10^2$ in proximity to the end thereof. 11 indicates gears which are mounted upon the drive wheels 7 and 8. 12 indicates gear pinions mounted on shafts $12^x$ carried in bearings mounted upon the side bars 3 and 4. 13 indicates sprocket pinions mounted upon the opposite ends of the short shafts $12^x$. The pinions 13 are connected by sprocket chains $13^x$ to the sprocket gears $10^5$ and $10^6$ located respectively upon the opposite end of the shaft $10^2$.

14 indicates a draw bar provided at its ends with clevises $14^x$ and $14'$. The clevis $14^x$ is provided with a link $14^2$ to which the load in the form of a plow 15 is connected.

Although I show the load as represented by a plow it will, of course, be understood that a plow is only used as an illustration.

17 indicates a bar provided at one end with a sleeve-like portion $17^x$ slidable on the depending portion $9^x$ of the lever 9. The opposite end of the bar 17 is provided with an upturned portion $17'$ connected by a link 16 to the clevis $14'$ carried on the opposite end of the draw bar 14. 18 indicates a lever which is swung upon the rear shaft 2. 19 indicates a lever arm swung upon the lever 9 just forward of its point of fulcrum formed by the shaft 1. The upper end of the lever 19 is connected by a link rod 20 to the lever 18. 21 indicates a link connecting the lever arm 15 intermediately of its length with a sleeve-like portion $17^x$ of the bar 17. A link 21 may be located at each side of the lever arm 19 and sleeve $17^x$ as indicated in Fig. 2. By adjusting the lever 18 the sleeve $17^x$ may be raised or lowered upon the portion $9^x$ so as to increase or decrease the leverage upon the lever 9 to suit conditions.

In order to hold the rear end of the draw bar 14 from lateral movement I provide a depending guide loop 22 which depends from the rear end of the lever 9 and through which the draw bar 14 extends. The driver's seat 23 may be also carried upon the free end of the lever 9. It will thus be seen that when a draw is exerted upon the load 15 that the pull of the load upon the draw bar 14 will tend to swing the lever on its fulcrum formed by the shaft 1 so as to raise the load formed by the engine 10 and seat 23 and thereby exert a downward pressure upon the drive wheels tending to increase their grip upon the ground surface and thereby improve their tractive qualities.

In Fig. 3, I have shown my construction adapted to a tractor provided with two wheels. In this construction 24 indicates the tractor wheels, a tractor wheel being arranged at each side of the center of the vehicle.

25⁰ indicates a lever corresponding to the lever 9 shown in Figs. 1 and 2. In this construction the engine 25 is located above the front axle 1 but slightly toward the rear. 26 indicates the draw bar connected by a clevis connection 27 to the depending arm 25ˣ of the lever 25. The opposite end of the draw bar passes through a depending link 28 carried by the rear end of the lever 25. The free end of the draw bar 26 is connected by a clevis 29 to the load indicated at 30. A suitable driving gear connection is provided between the shaft of the engine 25 and the drive wheels 24.

In Fig. 4, I have shown my device as applied to a three-wheeled vehicle in which 32 indicates the rear axle, 33 and 34 the rear wheels mounted upon the rear axle 32, 35 the front axle and 36 a tractor wheel mounted upon the front axle 35. In this form a pair of levers 37 and 38 each corresponding in form to the lever 9 of Figs. 1 and 2 is provided, the levers 37 and 38 being located at each side of the drive wheel 36 and swingably mounted upon the axle 35. Each of the levers 37 and 38 is provided with depending arms corresponding to the arms 9ˣ. 39 indicates a draw bar which is bifurcated at its forward end so as to form a substantially Y-shaped portion 40, the arms of which extend to each side of the drive wheel 36 and are connected by a suitable clevis connection such as indicated in Figs. 1 and 3 to the depending arms of the levers 37 and 38. The opposite end of the draw bar 39 is connected to the load in the manner already indicated in the foregoing description. 41 indicates the engine mounted upon the levers 37 and 38, the engine shaft 42 being connected by a suitable driving connection to the shaft 35 of the tractor wheel 36.

From the foregoing description it will be seen that I have devised a very simple means of increasing the hauling capacity of tractors without a proportionate increase in size and weight of the vehicle as has heretofore been necessary and thereby making possible the production of a tractor of light weight having the hauling capacity of a much larger and heavier tractor.

It will be understood that the gear connection between the engine and draw wheels is only shown for the purpose of illustration as any form of drive might be employed for this purpose.

What I claim as my invention is:

1. In a tractor vehicle, the combination with the forward axle, of a lever fulcrumed thereon intermediately of its length so as to form a rearwardly extending long arm adapted to be suitably weighted at its free end and a forwardly extending short arm, a depending extension to the end of the short arm, a bar extending rearwardly from the depending extension and slidable thereon, lever operated means for slidably adjusting the bar upon the depending extension, a draw bar connected at one end to the bar and adapted to be connected to the load at the opposite end.

2. In a tractor vehicle, the combination with the forward axle carrying the drive wheels, of a lever swung intermediately of its length on the forward axle so as to form a rearwardly extending long arm and a forwardly extending short arm, a depending extension to the short arm, a bar having a sleeve-like end slidable upon the depending extension, a lever swung upon the rear axle, a lever arm swung upon the main lever in proximity to its point of fulcrum, a link connection between the upper end of the lever arm and the operating lever, and a link connection between the intermediate portion of the lever arm and the sleeve of the bar, and a draw bar connecting the opposite end of the bar to the load.

HERBERT JOHNSTON BURKE.

Witnesses:
W. D. BEAMAN,
GEORGE SCHONTS.